July 14, 1925.
T. PAUL
1,545,921
COMBINATION SLIDE DEVICE
Filed Oct. 26, 1922    4 Sheets-Sheet 1
Fig 1.
| POLES. 1 | 2 | 3 | 4 | 5 | 6 | 7 | 8 | 9 | 10 | 11 | 12 |
|---|---|---|---|---|---|---|---|---|---|---|---|
| R.P.M. 60 Cycles | 3600 | | 1800 | 13 | 1200 | | 900 | | 720 | | 600 |
| G no | 1 2 3 4 5 6 7 8 9 10 11 12 13 14 15 16 17 18 19 20 21 22 23 24 25 26 27 28 29 30 31 32 33 34 35 36 | | | | | | | | | | |
| G's | 11 | | | | | | | | | | |
| G no | 1 2 3 4 5 6 7 8 9 10 11 12 13 14 15 16 17 18 19 20 21 22 23 24 25 26 27 28 29 30 31 32 33 34 35 36 | | | | | | | | | | |
| R.P.M. 25 Cycles | 1500 | 25 | 750 | | 500 | | 375 | | 300 | | 250 |
| POLES. 1 | 2 | 3 | 4 | 5 | 6 | 7 | 8 | 9 | 10 | 11 | 12 |
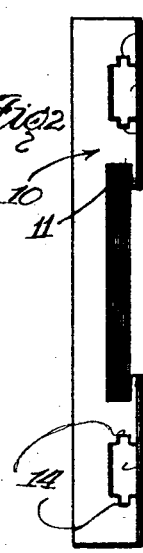
Fig 12.
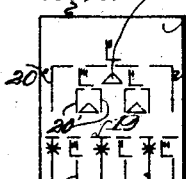
Fig 4.
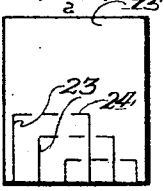
Fig 6.
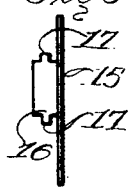
Fig 3.
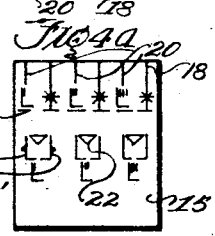
Fig 4a.
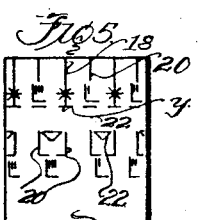
Fig 5.
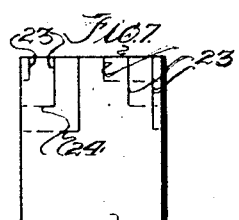
Fig 7.
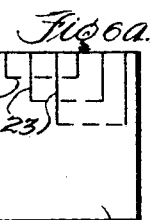
Fig 6a.
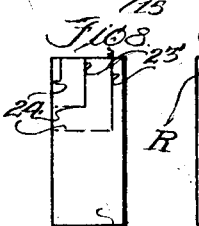
Fig 8.
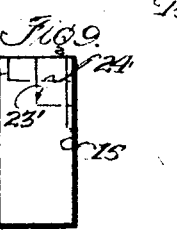
Fig 9.
WITNESSES
Nearl W. Fowler
INVENTOR
Thomas Paul.
BY
ATTORNEYS

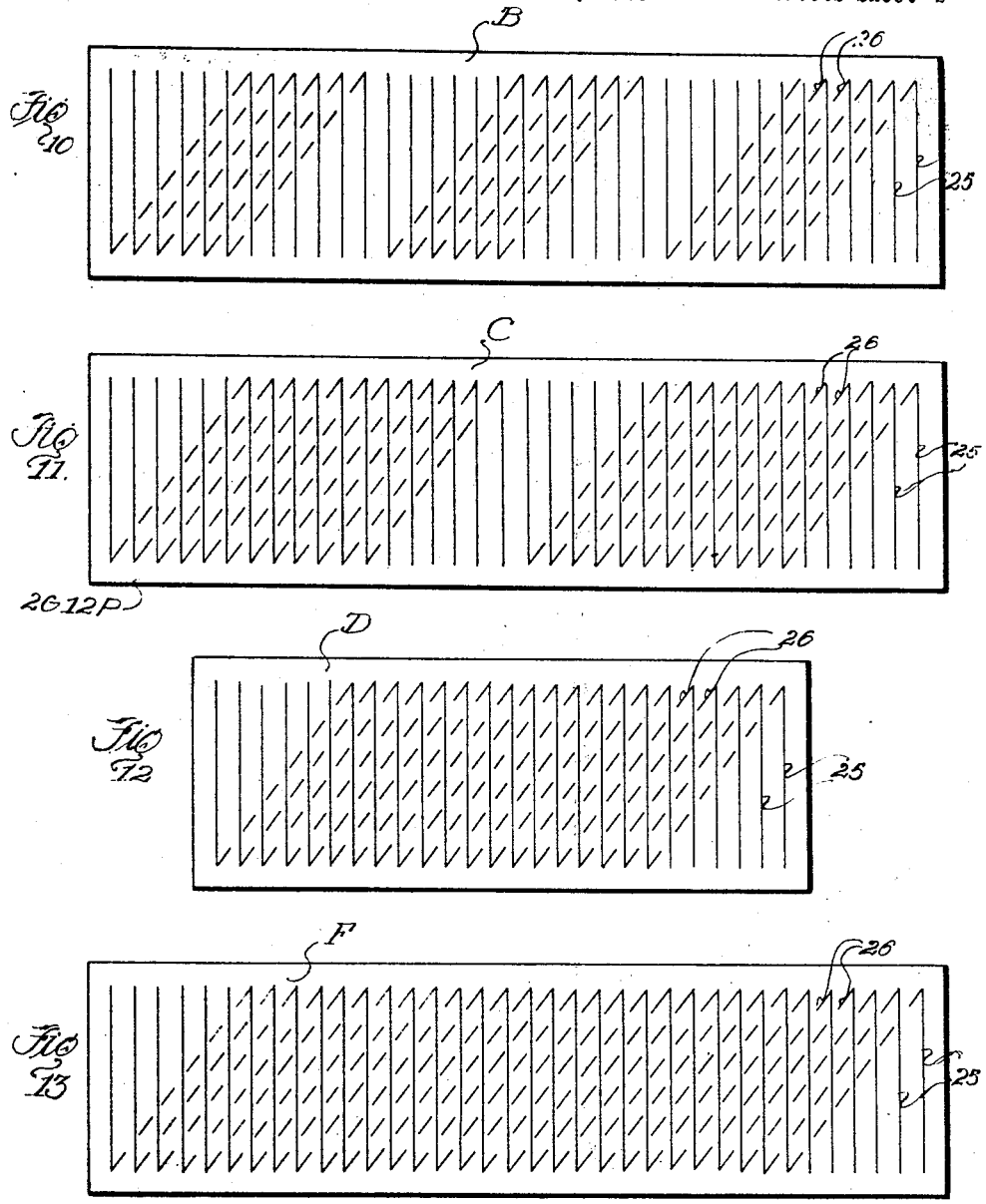

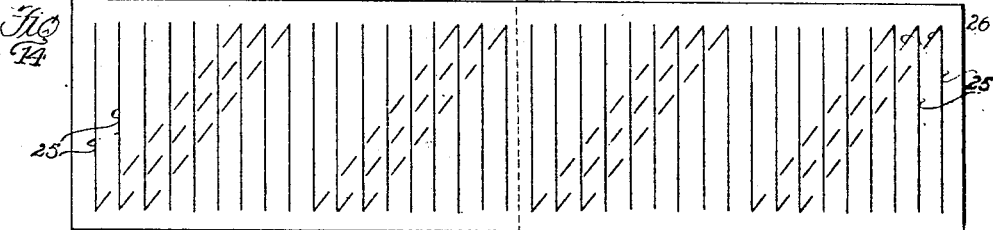
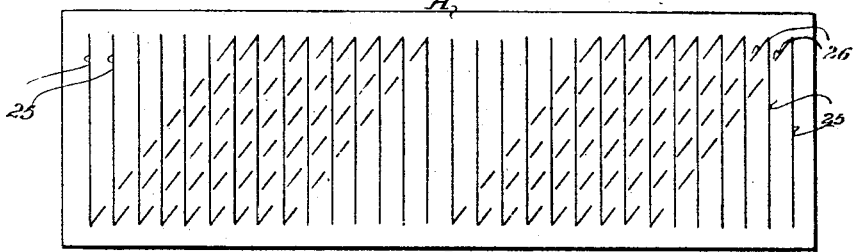
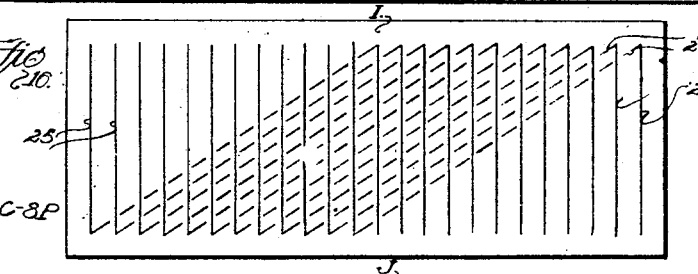
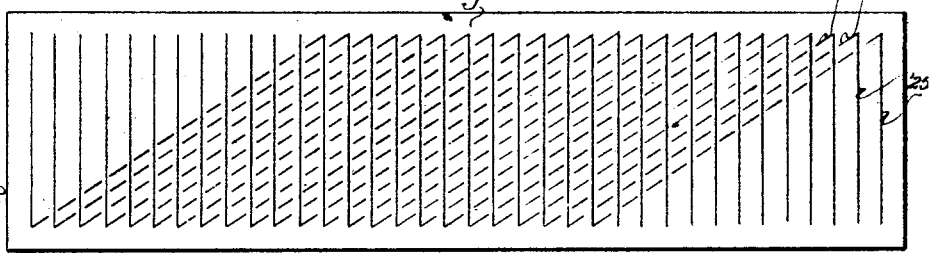
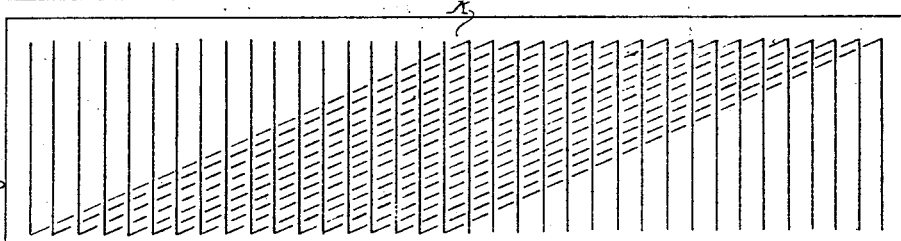

July 14, 1925.

T. PAUL 1,545,921

COMBINATION SLIDE DEVICE

Filed Oct. 26, 1922    4 Sheets-Sheet 4

Patented July 14, 1925.

1,545,921

UNITED STATES PATENT OFFICE.

THOMAS PAUL, OF TRAIL, BRITISH COLUMBIA, CANADA, ASSIGNOR OF ONE-HALF TO FREDERICK JAMES MORRISH, OF TRAIL, BRITISH COLUMBIA, CANADA.

COMBINATION SLIDE DEVICE.

Application filed October 26, 1922. Serial No. 597,211.

*To all whom it may concern:*

Be it known that I, THOMAS PAUL, a subject of the King of Great Britain, and a resident of Trail, British Columbia, Dominion of Canada, have invented certain new and useful Improvements in Combination Slide Devices, of which the following is a specification.

This invention relates to a combination slide for diagrammatically producing group connections for polyphase armature windings of alternating current motors or generators.

The object of the invention is to produce a device as above characterized which may be used by instructors, draftsmen, or armature winders for graphically depicting group connections of polyphase armature windings for alternating current motors or generators in a clear and accurate manner.

It is also an object of the invention that the slide device be exceedingly simple in construction and inexpensive to manufacture.

Other objects will hereinafter appear.

In carrying out the invention it is contemplated to employ a base and three sets of slides therefor, one set of slides indicating the leads of an armature winding which establish the different electrical circuits therein, the second set of slides indicating connectors for coil groups of an armature winding, and the third set of slides indicating different groups of coils for armature windings.

The invention is illustrated by way of example in the accompanying drawings, in which:

Figure 1 is a top plan view of a base of the slide.

Figure 2 is an end view of the same.

Figure 3 is an end view of one of the slides employed.

Figures 4, 4ª, and 5 are top plan views of different forms of lead slides.

Figures 6, 6ª, 7, 8 and 9 are similar views of group connector slides.

Figures 10 to 18 inclusive are top plan views of different forms of coil group slides.

Figure 19 is a top plan view of the device and showing different forms of slides positioned thereon for graphically indicating a form of armature connection.

Figure 20 is a similar view graphically indicating another form of armature connection.

Referring to the drawings in detail and particularly to Figures 1 and 2, the base comprises a rectangularly shaped member generally indicated by the reference numeral 10 and which preferably is of the thickness shown in Figure 2. This member may be made of wood or any other light and inexpensive material. The top face of the member 10 is provided with a central and longitudinally extending channel 11, said channel extending the entire length of the member 10 and having its side walls offset to provide an extension 12 along each upper longitudinal edge of said channel for a purpose which will later become apparent.

Upon each side of the channel 11 there is provided a groove 13, each groove having its side wall provided with a laterally extending groove or offset 14 to form guideways for the slides positioned in these grooves.

The lead slides and the group coil connector slides shown in Figures 4, 4ª, 5, 6, 6ª, 7, 8, 9, 19 and 20 are of uniform construction. Each slide consists in a substantially square plate 15 with the exception of the slides shown in Figures 8 and 9 in which case the plate is of rectangular shape. The plate 15 is preferably made of celluloid, and attached to the lower face of said plate is a runner 16 comprising a substantially rectangular shaped body member as shown in Figure 3 having an extension 17 formed upon each side thereof. The body member of the runner 16 in each instance is adapted to move within either of the slots 13 of the base member 10 and the extensions 17 are adapted to move in the associated grooves 14 of said slots and thereby rigidly hold the slide in position for movement longitudinally of the base member 10.

Each of the slides shown in Figures 10 to 18 inclusive and also the slide A shown in Figures 19 and 20 are preferably made of a thin celluloid sheeting.

As shown to advantage in Figure 1 along each longitudinal edge and upon the top face of the base member 10 there are arranged the numerals 1 to 12 inclusive, which are for the purpose of indicating the poles of an armature. It will be observed that these rows of numbers read consecutively and in the same direction. Also these numbers are so arranged that similar numbers of each row will occur directly opposite each other.

Let it be assumed that the armature to be dealt with is either star or delta wound, that a certain number of coils form a group, that one or more groups form a pole of the armature. If three-phase current is employed then three groups of coils would form one pole and if there were twelve poles there would be thirty-six groups of coils. For illustrating this matter there are arranged on each side of the channel 11 the numerals 1 to 36 inclusive as shown. These numerals may be referred to as the "group numbers".

In order to give the pupil or user of the present device further information relative to armatures for alternating current motors or generators, numerals are placed upon the base 10 to indicate the revolutions per minute of an armature for producing either 60 cycles or 25 cycles current with a given number of poles.

In Figures 4, 4ª and 5 the lead slides graphically show the lead connections for either star or delta windings. The slides shown in Figures 4 and 4ª are companions, that is, these two slides may be placed in separate grooves 13 and at the same end of the base 10. On each slide there are shown two sets of full lines 18 and 20 which extend parallel to one side of the plate 15 and occur along the inner edge of each slide. The lines 18 represent the neutral leads of the windings and each terminates at its inner end in a star, said stars being connected by a dashed line 19. The lines 20 represent the main leads and are designated by the reference characters L′, L″ and L‴. It will be noted that in Figure 4; L′ occurs intermediate L″ and L‴, while in Figure 4ª the reference characters L′, L″ and L‴ are arranged in consecutive order beginning at the left of the slide. This illustrates the possible relation of the leads. Also these slides may have other indicia thereon as at 22 whereby to indicate the delta leads of the armature. The leads L′, L″ and L‴ are differently arranged, and each letter has associated therewith the two lines 20′, and between the two lines there occurs the conventional sign 22 for indicating "delta winding". Figure 5 is substantially the same as Figure 4ª but with slight change of reference matter thereon.

Figures 6 and 6ª show top plan views of slides used for connecting coil groups. These two slides are substantially the same but when employed should be arranged in different grooves 13. Each plate 15 is provided with six full lines 23 and three broken lines 24. The broken lines connect with the full lines and the purpose of these lines is to show the connection between coil groups of an armature winding. In Figures 8 and 9 the plate 15′ in each instance is provided with three full lines 23′, and each full line having extended therefrom at right angles thereto a broken line 24′. The slide in Figure 7 is similar to slide 6ª with the exception of a slight change in the connection of lines.

The slides for graphically showing the coil groups of an armature and which may be referred to as the "group slides" may consist in any number desired, depending upon the number of different circuits and arrangements of armature coils it is desired to illustrate. Each of the slides employed should be made of a thin sheet of celluloid or a light material which agrees in length with the base 10 of the device and which is of such a width that the same will freely slide within the channel 11 in said base. A form of group slide is shown in Figures 19 and 20, and this slide is generally indicated by the reference character A. Other forms of group slides are shown in Figures 10 to 18 inclusive and indicated by the reference characters B, C, D, F, G, H, I, J, K respectively. Each full line 25 shown upon the slides represents a group of coils, and each dashed line 26 represents a connector for said groups of coils.

It should be here stated that the lead slide shown in Figure 19 may at all times be positioned in the guideway or groove 13 at the end representing the beginning of the poles. Also in this figure the connector slides of the form shown in Figures 6 and 7 have been used to connect a one circuit, two pole armature. In Figure 20 slides of the form shown in Figure 19 fill the groove 13 upon one side of the group slide A, while companion lead slides fill the same groove on the other side of the group slide A. This represents a parallel connection for armature leads and indicates or illustrates an armature with a large number of poles.

The form of coil group slide shown in Figure 10 and designated by the reference character B might be employed for three or six circuits and twelve poles, that is with the proper lead slides and connector slides the winding of such armatures would be diagrammatically shown. The form of slide C shown in Figure 11 might be employed for showing two circuits and six poles, while the form of slide D in Figure 12 would answer for showing an armature of two circuits and eight poles. The form of slide F, Figure 13 may illustrate an armature with two circuits and twelve poles; the form of slide G, Figure 14, may illustrate a four circuit armature with twelve poles; the form of slide H, Figure 15, may be used for illustrating an armature with two circuits and ten poles; the slide I, Figure 16, may illustrate two circuits and eight poles; the slide J, Figure 17, two or four circuits and twelve poles, and the slide K, Figure 18, three or six circuits and twelve poles. The different lead slides may also be manipulated to indicate either star or delta connection of the armature, and also the different slides permit illustrating whether or not the armature coils are connected in series or parallel.

I claim:

1. A combination slide device comprising a base having a plurality of parallel slide receiving grooves, a plurality of slides having indicia thereon to indicate connectors for coil groups of an armature winding, a slide with indicia thereon to indicate coil groups whereby with arranging the slides of the first named set along the sides of the coil group slide a wiring diagram for an armature may be presented.

2. A combination slide having a plurality of parallel slide receiving grooves, a plurality of slides with indicia thereon for indicating coil group connectors, a slide with indicia thereon to indicate the connections of armature leads to a source of current supply, a slide with indicia thereon to indicate coil groups, whereby with arranging the slide showing connections for armature leads and coil group connector slides along the sides of the coil group slide a diagram of an armature with its connections to a source of current supply may be presented.

3. A combination slide device comprising a base having a plurality of parallel slide receiving slots, a set of slides having indicia thereon to indicate connectors for coil groups of an armature winding, a set of slides with indicia thereon to indicate different coil groups of an armature winding, whereby with arranging slides of the first named set along the sides of a slide of the last named set different diagrams of armature winding may be presented.

THOMAS PAUL.